United States Patent [19]
Kim

[11] Patent Number: 6,141,140
[45] Date of Patent: Oct. 31, 2000

[54] OPTICAL MODULATOR USING ISOLATOR AND OPTICAL TRANSMITTER INCLUDING THE SAME

[75] Inventor: Sung-jun Kim, Pyeongtaek, Rep. of Korea

[73] Assignee: SamSung Electronics Co., Ltd., Suwon, Rep. of Korea

[21] Appl. No.: 09/207,580

[22] Filed: Dec. 8, 1998

[30] Foreign Application Priority Data

Dec. 8, 1997 [KR] Rep. of Korea ............... 1997/66750

[51] Int. Cl.⁷ .................. G02F 1/09; H04B 10/04
[52] U.S. Cl. ............... 359/281; 359/181; 359/280; 359/283
[58] Field of Search ................. 359/280, 281, 359/484, 181, 283

[56] References Cited

U.S. PATENT DOCUMENTS

| | | | |
|---|---|---|---|
| 4,027,948 | 6/1977 | Tanton et al. | 350/151 |
| 4,239,329 | 12/1980 | Matsumoto | 350/96.15 |
| 4,548,478 | 10/1985 | Shirasaki | 350/377 |
| 5,497,265 | 3/1996 | Fontana et al. | 359/341 |
| 5,812,710 | 9/1998 | Sugaya | 385/27 |

FOREIGN PATENT DOCUMENTS

| | | |
|---|---|---|
| 0 557 532 A1 | 9/1993 | European Pat. Off. |
| 58-049916 | 3/1983 | Japan . |
| 3-144417 | 6/1991 | Japan . |
| 6-252483 | 9/1994 | Japan . |
| 1 060 778 | 3/1967 | United Kingdom . |
| 1 436 442 | 5/1976 | United Kingdom . |
| 1 442 366 | 7/1976 | United Kingdom . |
| 2 264 181A | 8/1993 | United Kingdom . |
| 2 284 677A | 6/1995 | United Kingdom . |
| 2 313 675A | 12/1997 | United Kingdom . |

OTHER PUBLICATIONS

JP 080171075A Fuji Electrochem.

*Primary Examiner*—Scott J. Sugarman
*Assistant Examiner*—David N. Spector
*Attorney, Agent, or Firm*—Robert E. Bushnell, Esq.

[57] ABSTRACT

An optical modulator using an isolator, and an optical transmitter including the same are provided. The optical modulator modulates a carrier wave generated by an optical source according to a predetermined electrical signal. An isolator in the modulator includes a Faraday rotator in which the rotation angle of polarization is different according to the intensity of an applied magnetic field. The rotator controls isolation of an optical signal according to the polarization rotation angle and outputs a modulated optical signal. A magnetic field generator produces a magnetic field whose intensity is controlled by a predetermined electrical signal, and applies the produced magnetic field to the isolator. A signal generator supplies the electrical signal to the magnetic field generator and controls the intensity of the electrical signal. The magnetic field generator is mounted on the optical isolator, and the electric signal applied to the magnetic field generator is adjusted to control the intensity of the magnetic field formed in the isolator. Accordingly, isolation of an optical signal is activated or deactivated, thereby modulating a continuous wave optical signal. Thus, a small and cheap optical modulator having an excellent temperature property can be realized and easily housed in the transmitter.

23 Claims, 2 Drawing Sheets

OPTICAL MODULATOR USING ISOLATOR AND OPTICAL TRANSMITTER INCLUDING THE SAME

CLAIM OF PRIORITY

This application makes reference to, incorporates the same herein, and claims all benefits accruing under 35 U.S.C. §119 from an application for OPTICAL MODULATOR USING ISOLATOR AND OPTICAL TRANSMITTER INCLUDING THE SAME earlier filed in the Korean Industrial Property Office on the 8$^{th}$ of December 1997 and there duly assigned Ser. No. 66750/1997.

BACKGROUND OF THE INVENTION

1. Technical Field

The present invention relates to an optical modulator using an isolator and an optical transmitter including the same. More particularly, the invention relates to an optical modulator for modulating a continuous wave optical beam by provoking optical attenuation by varying a magnetic field applied to an isolator, and an optical transmitter including the same.

2. Related Art

An optical modulator modulates a continuous wave optical beam into an optical signal which has the same form as an electrical signal. When several wavelength optical signals are simultaneously transmitted by a wavelength division multiplexing (WDM) system, their center wavelengths are jittered by the chirping property of an optical signal spectrum which is generated by applying an electrical signal, thus degrading the transmission characteristics. In order to solve this problem, a laser diode is driven to output a continuous wave, and a beam output by the laser diode is modulated. Optical modulation is accomplished by an external modulator such as an electro-optic modulator or a lithumnaobate (LiNbO$_3$) modulator.

FIG. 1 is a block diagram illustrating the configuration of a conventional optical modulator. Referring to FIG. 1, the optical modulator comprises a laser diode 100, first optical waveguide 102, second optical waveguide 104, an electrode plate 106, and an electric signal source 108.

The operation of the above elements will now be described. First, a continuous optical signal applied from the laser diode 100 is coupled into the optical waveguides 102 and 104. When an electrical signal is applied by the electrical signal source 108 to the electrode plate 106, the refractive index of the first optical waveguide 102 is changed. The changed refractive index changes the propagation constant of the first optical waveguide 102, and the changed propagation constant changes the phase of an optical signal passing through the first optical waveguide 102. Accordingly, there is a phase difference between the phase-changed optical signal of the first optical waveguide 102 and a non-phase-changed optical signal of the second optical waveguide 104.

The output optical signal of the optical modulator is modulated according to this phase difference. That is, when the two phases are the same, the output optical signal is intensified, but when the two phases have a difference of 180°, the output optical signal is canceled out. In this way, the output optical signal is turned on/off (modulated) at an output port. The extinction ratio in an off state is about 22 dB.

However, in this optical modulator, insertion loss is high (generally, about 6 dB), and a change in its characteristics due to polarization is severe. Also, this modulator requires a high reference voltage and an electrical modulation signal. This modulator also requires a heat release process since internal heat becomes high when such a high voltage is applied.

In a low-cost optical modulation technique for a subscriber network, a spectrum sliced source using amplified spontaneous emission of an optical amplifier is used as a continuous wave optical source, and a method of modulating an electrical signal into an optical signal using the aforementioned external modulator is adopted. In this case, more costs are required in order to include a subscriber network, due to the high cost of an expensive optical modulator.

Thus, as described above, optical modulators are burdened by the disadvantages of high insertion loss and severe changes in their characteristics due to polarization. In addition, such modulators require a high reference voltage, an electrical modulation signal, and a heat release procedure. Therefore, there is a need for an optical modulator which does not suffer the above disadvantages and other disadvantages disclosed herein.

SUMMARY OF THE INVENTION

To solve the above problem, it is an object of the present invention to provide an optical modulator using an isolator, and an optical transmitter including the same, in which an output optical signal is modulated by changing the polarization of a Faraday rotator by generating and applying a magnetic field to the isolator.

To achieve the above object, there is provided an optical modulator, using an isolator, for modulating a carrier wave generated by an optical source according to a predetermined electrical signal. The optical modulator comprises: an isolator, including a Faraday rotator in which the rotation angle of polarization is different according to the intensity of an applied magnetic field, for controlling isolation of an optical signal according to the polarization rotation angle, and for outputting a modulated optical signal; a magnetic field generator for producing a magnetic field whose intensity is controlled by a predetermined electrical signal, and for applying the produced magnetic field to the isolator; and a signal generator for supplying the electrical signal to the magnetic field generator, and for controlling the intensity of the electrical signal.

To achieve the above object, there is provided an optical transmitter comprising: an optical source for generating a carrier wave; an isolator including a Faraday rotator in which the rotation angle of polarization is different according to the intensity of an applied magnetic field, for controlling isolation of the carrier wave optical signal generated by the optical source according to the polarization rotation angle, and for outputting a modulated optical signal; a magnetic field generator for producing a magnetic field whose intensity is controlled by a predetermined electrical signal, and for applying the produced magnetic field to the isolator; a signal generator for supplying the electrical signal to the magnetic field generator, and for controlling the intensity of the electrical signal; and an optical amplifier for amplifying an optical signal modulated in the isolator, and for transmitting the amplified optical signal to a transmission channel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
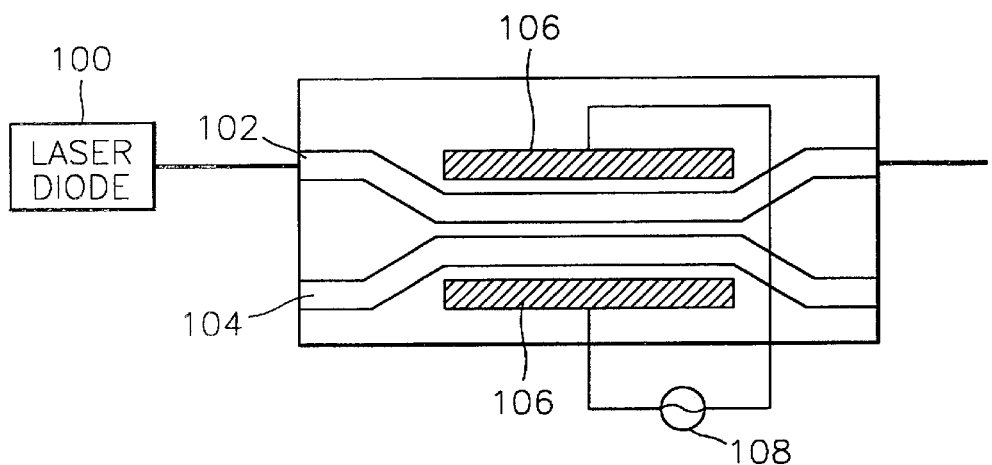
FIG. 1 is a block diagram illustrating the configuration of a conventional optical modulator.
Figure 2:
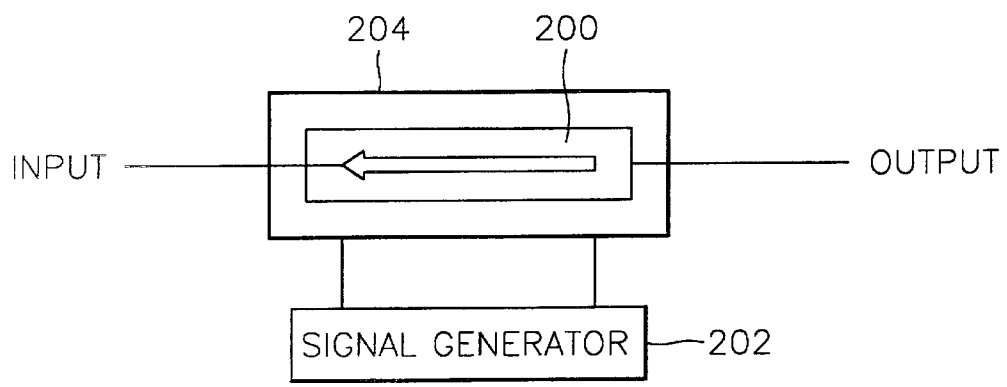
FIG. 2 is a block diagram of an optical modulator using an isolator according to the present invention.

FIG. 2 is a block diagram of an optical modulator using an isolator according to the present invention.

Referring to FIG. 2, an optical modulator includes an isolator 200, a magnetic field generator 204, and a signal generator 202. The magnetic field generator 204 is preferably an electromagnet in which a magnetic field can be generated by an electrical signal.

The operation of the present invention will now be described based on the above-described configuration. First, a continuous wave optical signal input enters via an optical fiber input end (not shown), and is blocked by an isolator 200. An electrical signal generated by a signal generator 202 activates/deactivates the electromagnetic field of the magnetic field generator 204 to enable/disable isolation of the isolator 200. The on/off state of isolation can be considered as an on/off state of attenuation with respect to an optical signal input. That is, when an electric signal generated by the signal generator 202 is applied to the magnetic field generator 204, a magnetic field is formed. For example, the magnetic field generator 204 is an electromagnet and the electric signal is "1" (high). Then, the continuous wave optical signal input incident upon the isolator 200 passes through the isolator 200 and is output to an output end. When the electric signal is "0" (low), a magnetic field is not formed in the isolator 200. Thus, the continuous wave optical signal input does not pass through the isolator 200 and cannot be output to the output end. The continuous wave optical signal is turned on or off depending on the on/off state of the electric signal, thereby achieving optical modulation. In the optical modulator operating as described above, the extinction ratio can range between 0.5 dB and 50 dB.

Figure 3:
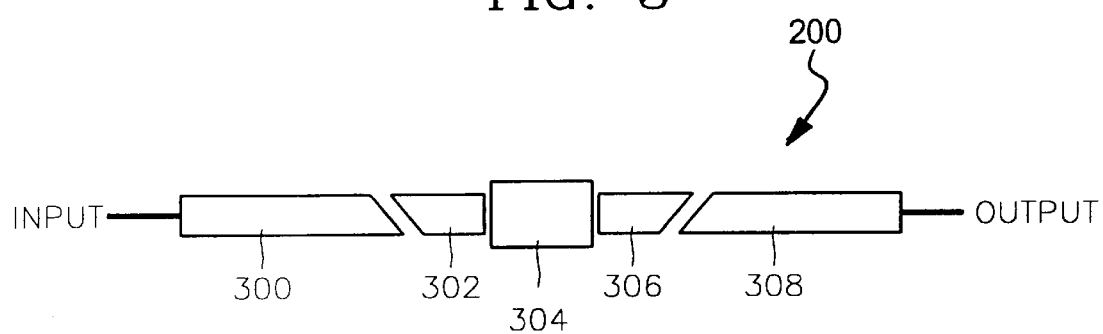
FIG. 3 is a block diagram of the isolator of FIG. 2.

FIG. 3 is a block diagram of the isolator of FIG. 2. The isolator 200 allows light to be transmitted from an input projection port to an output port with low loss, and prevents reverse traveling and recombination of light with high loss, thus maintaining stable operation of the system. For example, while light emitted by a laser diode travels in a light transmission direction, reflected light is generated in a connecter where optical fibers are spliced to each other, or where reflective noise is generated due to light traveling backward when connected to various other devices. The isolator 200 prevents the above problems, and is necessary particularly in optical communications of 1 Gbps or higher speed, and a high sensitivity sensor where problems are generated by reflected light.

The isolator 200 of FIG. 3 includes a first collimator 300, a first double refraction element 302, a Faraday rotator 304, a second double refraction element 306, and a second collimator 308. Rutile or calcite is suitable as a material of the double refraction elements 302 and 306. The first double refraction element 302 operates as a polarizer, and the second double refraction element 306 operates as an analyzer. The principle is that only polarized light of one direction passes, and polarized light perpendicular to the above polarized light does not pass. The essential parameter between the polarizer and the analyzer is the extinction ratio of passing polarized light to polarized light that is perpendicular to the passing polarized light.

The Faraday rotator 304 rotates the polarization plane of incident light by 45°. The light rotated by 45° is reflected in a reverse direction by the rear end of the Faraday rotator 304, reenters rotator 304, and is then rotated by 45° again. Thus, the light is rotated by a total of 90°. Accordingly, the reflected wave rotated by 90° is blocked by the polarizer. The Faraday rotator 304 generates a Faraday rotation by a Faraday effect when a magnetic field is applied to the magneto-optic material in a traveling direction. The Faraday effect is such that the polarization plane of light rotates while the light passes through a magneto-optic material.

The performance of the isolator 200 is determined by forward insertion loss and backward isolation. The isolator 200 usually has insertion loss of about 1 dB and isolation of about 30 dB due to reflection at an element junction, a defective polarizer and a defective rotator.

The operation of the isolator 200 of FIG. 3 will now be described. The first collimator 300 collects and collimates light emitted by a first optical fiber or a laser diode (not shown). The collimated light is divided by the first double refraction element 302 into two beams having respective polarized directions which are perpendicular to each other. The two beams pass through different paths, and are incident upon the Faraday rotator 304. The light entering the Faraday rotator 304 is rotated by 45° in existing polarized light directions, while polarized directions are kept perpendicular to each other. When the polarization direction-changed beams again pass through the second double refraction element 306, the two beams are united into one. Then, the two beams are collimated by the second collimator 308, and the collimated beam enters a second optical fiber (not shown). The Faraday rotator 304 allows the isolator 200 to maintain a constant magnetic field so that polarization can be changed by 45°. However, if a magnetic field is generated in the vicinity of the isolator 200, the magnetic field of a magnet comprising the Faraday rotator 304 is affected. Also, the Faraday rotator 304 changes the rotation angle of polarization according to the intensity of the magnetic field as represented by the following Equation 1:

$$\theta = VBl \qquad (1)$$

wherein θ is a rotation angle, V is a constant, B is the intensity of a magnetic field, and l is an interaction length.

When polarization is changed by an external magnetic field as represented in Equation 1, the paths of light beams polarized perpendicular to each other by the second double refraction element 306 are changed, which consequently changes the amount of light incident upon the second optical fiber via the second collimator 308. That is, the intensity of the magnetic field varies with the intensity of an external electric signal (current), and the loss characteristic of the isolator 200 differs depending on the variation of the magnetic field intensity.

Figure 4:
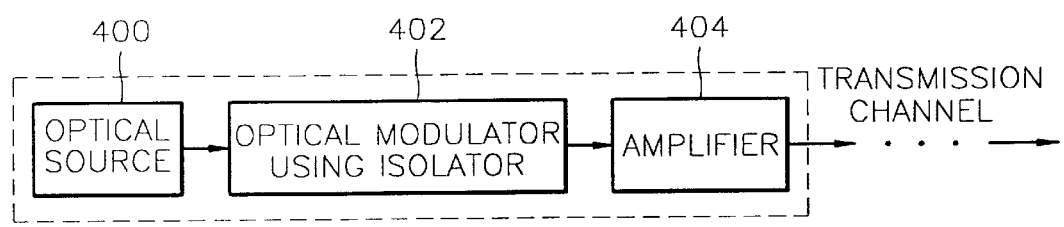
FIG. 4 is a block diagram illustrating a transmitter including an optical modulator using an isolator according to the present invention.

FIG. 4 is a block diagram of an optical transmitter including an optical modulator using an isolator according to the present invention. The optical transmitter of FIG. 4 includes an optical source 400, an optical modulator 402 using an isolator, and an amplifier 404.

The operation of the above-mentioned elements will now be described. First, when a carrier wave for information transmission is generated by an optical source 400, such as a laser diode or a light emitting diode, the carrier wave emitted by the optical source 400 is switched on or off at an appropriate time by the optical modulator 402. The modulated optical signal produced by modulator 402 is amplified by the amplifier 404, and is transmitted to the next port via a transmission channel.

As to the transmission of a wavelength division multiplexed (WDM) optical signal, carrier wave beams from various optical sources are modulated and multiplexed, and are then transmitted. In an optical subscriber network, light carrying information and carrier wave light are transmitted from an optical transmission system to a subscriber port. At the subscriber port, the light carrying information is applied to a detector and converted into an electrical signal, and the carrier wave light carries information on a subscriber via the optical modulator using the isolator, and is transmitted back to the optical transmission system.

According to the present invention, a magnetic field generator is mounted on an optical isolator, and an electric signal applied to the magnetic field generator is adjusted to control the intensity of a magnetic field formed in the isolator. Accordingly, isolation of an optical signal is activated or deactivated, thereby modulating a continuous wave optical signal. Therefore, a small and cheap optical modulator having an excellent temperature property can be realized and easily mounted on a transmitter. Also, the optical modulator is fixed to a laser diode and can perform optical modulation by changing only the intensity of an electrical signal. Hence, it is not sensitive to external factors such as dust, temperature and humidity, and there is little phase difference with respect to polarization.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical modulator for modulating a carrier wave generated by an optical source according to a predetermined electrical signal, said optical modulator comprising:

an isolator including a Faraday rotator in which a rotation angle of polarization is different according to an intensity of an applied magnetic field, said isolator controlling isolation of an optical signal according to the rotation angle of polarization and outputting a modulated optical signal;

a magnetic field generator for producing a magnetic field having an intensity which is controlled by a predetermined electrical signal, and for applying the produced magnetic field to the isolator; and a signal generator for supplying the electrical signal to the magnetic field generator and for controlling an intensity of the electrical signal;

wherein said isolator includes double refracting means for splitting said optical signal into two optical signal outputs having different polarization, said two optical signal outputs being provided as an input to said Faraday rotator; and wherein said isolator further includes additional double refracting means connected to outputs of said Faraday rotator for forming a single optical output from said outputs of said Faraday rotator, and collimator means for receiving said single optical output and providing said modulated optical signal.

2. The optical modulator of claim 1, wherein the magnetic field generator comprises an electromagnet.

3. The optical modulator of claim 2, wherein the isolator isolates the optical signal according to a level of the electrical signal, said level being one of high and low.

4. The optical modulator of claim 1, wherein said isolator includes additional collimator means for receiving and collimating the optical signal, and for providing said received and collimated optical signal to said double refracting means.

5. The optical modulator of claim 1, wherein the isolator isolates the optical signal according to a level of the electrical signal, said level being one of high and low.

6. The optical modulator of claim 1, wherein said magnetic field generator responds to a first electrical signal for forming a magnetic field, and responds to a second electrical signal for not forming a magnetic field; and wherein said Faraday rotator passes the optical signal to an output thereof in response to formation of the magnetic field, and blocks the optical signal in response to non-formation of the magnetic field.

7. An optical transmitter, comprising:

an optical source for generating a carrier wave optical signal;

an isolator including a Faraday rotator in which a rotation angle of polarization is different according to an intensity of an applied magnetic field, said isolator controlling isolation of the carrier wave optical signal generated by the optical source according to the rotation angle of polarization and outputting a modulated optical signal;

a magnetic field generator for producing a magnetic field having an intensity which is controlled by a predetermined electrical signal, and for applying the produced magnetic field to the isolator;

a signal generator for supplying the electrical signal to the magnetic field generator and for controlling an intensity of the electrical signal; and an optical amplifier for amplifying the modulated optical signal, and for transmitting the amplified optical signal to a transmission channel;

wherein said isolator includes refracting means for slitting said optical signal into two optical signal outputs having different polarization, said two optical signal outputs being provided as an input to said Faraday rotator; and wherein said isolator further includes additional refracting means connected to outputs of said Faraday rotator for forming a single optical output from said outputs of said Faraday rotator, and collimator means for receiving said single optical output and providing said modulated optical signal.

8. The optical transmitter of claim 7, wherein the magnetic field generator comprises an electromagnet.

9. The optical transmitter of claim 8, wherein the isolator isolates the optical signal according to a level of the electrical signal, said level being one of high and low.

10. The optical transmitter of claim 7, wherein said isolator includes additional collimator means for receiving and collimating the optical signal, and for providing said received and collimated optical signal to said refracting means.

11. The optical transmitter of claim 7, wherein the isolator isolates the optical signal according to a level of the electrical signal, said level being one of high and low.

12. The optical transmitter of claim 7, wherein said magnetic field generator responds to a first electrical signal for forming a magnetic field, and responds to a second electrical signal for not forming a magnetic field; and wherein said Faraday rotator passes the optical signal to an output thereof in response to formation of the magnetic field, and blocks the optical signal in response to non-formation of the magnetic field.

13. An optical modulator for modulating an optical input, comprising:

signal generating means for generating an electrical signal having an intensity;

magnetic field generating means responsive to the electrical signal for generating a magnetic field having an intensity dependent on the intensity of the electrical signal; and isolator means responsive to the intensity of the magnetic field generated by said magnetic field generating means for varying a polarization angle of the optical input so as to control isolation of the optical input from an output of said optical modulator, thereby producing a modulated output signal;

wherein said isolator includes a refractor for splitting said optical signal into two optical signal outputs having different polarizations, said two optical signal outputs being providing as an input to a rotator; and wherein said isolator means further includes an additional refractor connected to outputs of said rotator for forming a single optical output from said outputs of said rotator, and a collimator for receiving said single optical output and providing said modulated optical signal.

14. The optical modulator of claim 13, wherein the magnetic field generating means comprises an electromagnet.

15. The optical modulator of claim 13, wherein said isolator means includes an additional collimator for receiving and collimating the optical signal, and for providing said received and collimated optical signal to said refractor.

16. The optical modulator of claim 13, wherein said magnetic field generating means responds to a first electrical signal for forming a magnetic field, and responds to a second electrical signal for not forming a magnetic field; and wherein said isolator means passes the optical signal to an output thereof in response to formation of the magnetic field, and blocks the optical signal in response to non-formation of the magnetic field.

17. An optical transmitter comprising an optical modulator as claimed in claim 13.

18. The optical modulator of claim 1, wherein said double refracting means operates as a polarizer, and said additional double refracting means operates as an analyzer.

19. The optical modulator of claim 1, wherein said Faraday rotator rotates a polarization plane of incident light by 45 degrees, and the light rotated by 45 degrees is reflected in a reverse direction by a rear end of the Faraday rotator, enters the Faraday rotator, and again rotated by 45 degrees in the Faraday rotator.

20. The optical transmitter of claim 7, wherein said refracting means operates as a polarizer, and said additional refracting means operates as an analyzer.

21. The optical transmitter of claim 7, wherein said Faraday rotator rotates a polarization plane of incident light by 45 degrees, and the light rotated by 45 degrees is refracted in a reverse direction by a rear end of the Faraday rotator, enters the Faraday rotator, and again rotated by 45 degrees in the Faraday rotator.

22. The optical modulator of claims 13, wherein said refractor operates as a polarizer, and said additional refractor operates as an analyzer.

23. The optical modulator of claim 13, wherein said rotator rotates a polarization plane of incident light by 45 degrees, and the light rotated by 45 degrees is refracted in a reverse direction by a rear end of the rotator, enters the rotator, and is gain rotated by 45 degrees in the rotator.

* * * * *